(12) United States Patent
Horii et al.

(10) Patent No.: US 11,455,035 B2
(45) Date of Patent: Sep. 27, 2022

(54) INPUTS TO VIRTUAL REALITY DEVICES FROM TOUCH SURFACE DEVICES

(71) Applicant: Hewlett-Packard Development Company, L.P., Spring, TX (US)

(72) Inventors: Hiroshi Horii, Palo Alto, CA (US); Mithra Vankipuram, Palo Alto, CA (US); Ian N. Robinson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/970,513

(22) PCT Filed: Apr. 19, 2018

(86) PCT No.: PCT/US2018/028377
§ 371 (c)(1),
(2) Date: Aug. 17, 2020

(87) PCT Pub. No.: WO2019/203837
PCT Pub. Date: Oct. 24, 2019

(65) Prior Publication Data
US 2022/0011861 A1    Jan. 13, 2022

(51) Int. Cl.
*G06F 3/041* (2006.01)
*G06F 3/01* (2006.01)
(Continued)

(52) U.S. Cl.
CPC .............. *G06F 3/014* (2013.01); *G06F 3/016* (2013.01); *G06F 3/038* (2013.01); *G06F 3/041* (2013.01);
(Continued)

(58) Field of Classification Search
CPC .......... G06F 3/014; G06F 3/016; G06F 3/038; G06F 3/041; G06F 3/04886; G06F 2203/0384
See application file for complete search history.

(56) References Cited

U.S. PATENT DOCUMENTS 9,811,184 B2   11/2017   Buckley
9,886,086 B2   2/2018    Diament et al.
(Continued)

FOREIGN PATENT DOCUMENTS

| EP | 3223061 A1 | 9/2017 |
|---|---|---|
| WO | 2016/130895 A1 | 8/2016 |
| WO | WO-2017-171418 A1 | 10/2017 |

*Primary Examiner* — Carolyn R Edwards
(74) *Attorney, Agent, or Firm* — Tong Rea Bentley & Kim LLC (57) ABSTRACT

In example implementations, a virtual reality (VR) system is provided. The VR system includes a head mounted display (HMD), a hand wearable interface, a wireless communication interface, and a processor. The HMD is to display a computer generated artificial world. The wireless communication interface is to establish a wireless communication path. The processor is communicatively coupled to the HMD, the hand wearable interface, and the wireless communication interface. The processor is to receive an indication that a touch screen device is located from a locator device in the HMD or the hand wearable device, to establish a wireless connection to the touch screen device via the wireless communication interface, and to receive an input via the touch screen device.

16 Claims, 5 Drawing Sheets

(51) Int. Cl.
*G06F 3/038* (2013.01)
*G06F 3/04886* (2022.01)

(52) U.S. Cl.
CPC .. *G06F 3/04886* (2013.01); *G06F 2203/0384* (2013.01)

(56) References Cited

U.S. PATENT DOCUMENTS

| | | |
|---|---|---|
| 2012/0218188 A1 | 8/2012 | Kashitani |
| 2013/0335573 A1 | 12/2013 | Forutanpour et al. |
| 2016/0140332 A1* | 5/2016 | Pfursich ............. G06K 9/00255 726/19 |
| 2016/0267712 A1 | 9/2016 | Nartker et al. |
| 2016/0274662 A1* | 9/2016 | Rimon ...................... G06F 3/16 |
| 2017/0011553 A1 | 1/2017 | Chen et al. |
| 2017/0012972 A1 | 1/2017 | Tanaka et al. |
| 2017/0090744 A1 | 3/2017 | Kim |
| 2017/0287060 A1* | 10/2017 | Choi ....................... G06T 15/04 |
| 2017/0293351 A1 | 10/2017 | Li |
| 2017/0300116 A1 | 10/2017 | Lyons et al. |
| 2017/0329419 A1 | 11/2017 | Dearman et al. |
| 2018/0095542 A1 | 4/2018 | Mallinson |
| 2019/0174088 A1* | 6/2019 | Kim ................... H04N 5/44504 |
| 2019/0369726 A1* | 12/2019 | Kang ................... G02B 27/017 |
| 2020/0064921 A1* | 2/2020 | Kang ................... G02B 27/017 |

\* cited by examiner

INPUTS TO VIRTUAL REALITY DEVICES FROM TOUCH SURFACE DEVICES

BACKGROUND

Virtual reality (VR) systems are wearable interactive systems that allow a user to experience an artificial world. The user may visually see a computer generated world through a display of the VR system. The VR system may provide entertainment, simulations, and the like. For example, the artificial world may be part of a video game for entertainment. In another example, the VR world may be a simulation to train an employee for a procedure or process in a corporate setting.

DETAILED DESCRIPTION

Examples described herein provide a virtual reality (VR) system that can connect to a touch surface device and receive inputs from the touch surface device. As discussed above, VR systems are wearable interactive systems that allow a user to experience an artificial world. The user may visually see a computer generated world through a display of the VR system.

In some instances, it may be more efficient to provide inputs using a touch screen device than using hand gestures in the artificial world of the VR system. However, when the user is wearing the head mounted display (HMD) of the VR system, the user may not be able to see the real world surroundings (which may include a touch screen device).

Examples herein provide a VR system that can be used to automatically locate a nearby touch surface device while the user is engaged in an artificial world of the VR system. Thus, the user may locate a touch screen device, automatically connect to the touch screen device, and use the touch screen device to provide inputs while in the artificial world of the VR system. In other words, the user does not need to remove the HMD of the VR system to find, and connect to, the touch screen device.

Figure 1:
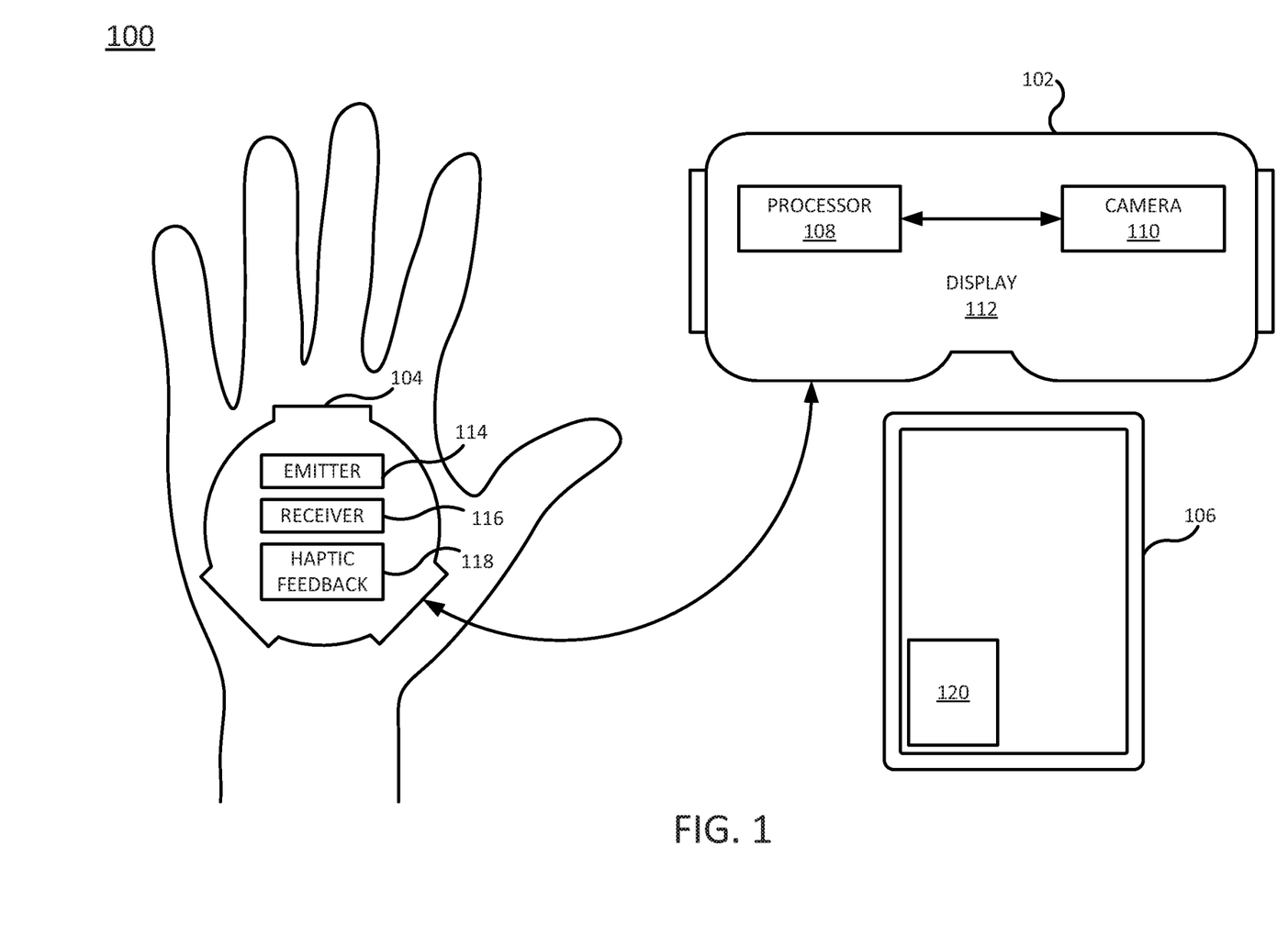
FIG. 1 is a block diagram of an example of a virtual reality system with a touch surface device of the present disclosure.

FIG. 1 illustrates a block diagram of a VR system 100 of the present disclosure. In one example, the VR system 100 may include a head mounted display (HMD) 102, a hand wearable interface 104, and a touch screen device 106. The VR system 100 may include a processor 108 that may be communicatively coupled to the hand wearable interface 104 via a wired or wireless connection. In one example, the processor 108 may be located external to the HMD 102. In one example, as shown in FIG. 1, the processor 108 may be integrated as part of the HMD 102. The processor 108 may execute various instructions stored in memory and/or functions, as described below.

As described above, sometimes using a touch screen device may be a more accurate way of providing inputs to the HMD 102 than using hand gestures via the hand wearable interface 104. However, when the HMD 102 is active and displaying a computer generated artificial world on a display 112 in a virtual reality (VR) mode, the user may not be able to see where the touch screen device 106 is located.

In one example, the touch screen device 106 may have a marker 120 that can be detected by the HMD 102 and/or the hand wearable interface 104. No other objects in the room may appear in the display 112 when the VR mode is active except the marker 120.

In one example, the marker 120 may be a pre-defined dynamic marker that can be detected by a camera 110 (e.g., a red, green, blue (RGB) video camera, an infrared camera, and the like) coupled to the HMD 102. For example, a user may look around a room with the HMD 102 to see if the pre-defined dynamic marker appears in the display 112. The pre-defined dynamic marker may be a constantly changing mark or code, as opposed to a static or fixed code. The shape of the pre-defined dynamic marker may change periodically, the colors of the pre-defined dynamic marker may change periodically, the codes within the pre-defined dynamic marker may change periodically, and the like.

In one example, the marker 120 may be an emission of a particular wavelength of light. For example, the camera 110 may be an infrared camera and may detect an infrared wavelength of light emitted by the touch screen device 106 that is invisible to the human eye so as not to distract non-users of the VR system 100. The infrared wavelength of light may allow a non-user of the VR system 100 to use the touch screen device 106 as a traditional device, while allowing the camera 110 to locate the touch screen device 106. The infrared wavelength of light may be shown on the display 112 such that the user may move towards the touch screen device 106.

In one example, the touch screen device 106 may be registered with the processor 108 of the VR system 100. Thus, the VR system 100 may know the dimensions of the display of the touch screen device 106. The HMD 102 or the hand wearable interface 104 may emit a signal to wake the touch screen device 106. The marker 120 may be a glow of the display of the touch screen device 106. The camera 110 may then identify the touch screen device 106 by searching for a light emitted from a screen that has the same dimensions as the touch screen device 106 that was registered with the VR system 100.

In one example, the hand wearable interface 104 may be used to locate the touch screen device 106 without the marker 120. In one example, the hand wearable interface 104 may include an emitter 114. The emitter 114 may be a wireless emitter that broadcasts a wireless signal.

When the touch screen device 106 receives the wireless signal, the touch screen device 106 may transmit a response signal that is received by a receiver 116. The receiver 116 may be a wireless receiver that receives the response signal from the touch screen device 106. Examples of such wireless links may include Bluetooth, radio frequency identification (RFID), near field communications (NFC), and the like. In one example, the distance to the touch screen device 106 may be calculated based on the time to receive the response signal from the touch screen device 106. When the response signal is received, an avatar of the touch screen device 106 may be shown in the display 112. The avatar may grow smaller or larger as the user moves further away from or closer to the touch screen device 106.

In one example, the hand wearable interface 104 may include a haptic feedback 118. The haptic feedback 118 may be a component that provides feedback (e.g., a vibration or a buzz) to the user when the hand wearable interface 104 is located over or within a pre-defined distance (e.g., a few inches) from the touch screen device 106. In one example, the strength of the haptic feedback may vary and be proportional to the detected proximity of the device. Thus, the user can locate and grab the touch screen device 106 when the haptic feedback 118 provides constant feedback.

In one example, after the user is done with the touch screen device 106, the user may place the touch screen device 106 at a location. The VR system 100 may remember the location where the touch screen device 106 was placed such that the touch screen device 106 may be located more quickly the next time the user want to locate and use the touch screen device 106.

Once the touch screen device 106 is located, the touch screen device 106 may be held. The camera 110 may be used to detect an orientation of the touch screen device 106. In one example, the touch screen device 106 may have sensors that can detect the orientation of the touch screen device 106. The orientation of the touch screen device 106 can be transmitted to the processor 108 for display. After the touch screen device 106 is located, held by the user, and the orientation is detected, the touch screen device 106 may be communicatively coupled to the HMD 102. The touch screen device 106 may also be shown in the computer generated artificial world in the orientation that is detected, as discussed in further detail below. The touch screen device 106 can then be used to provide inputs to the computer generated artificial world displayed on the display 112.

Figure 2:
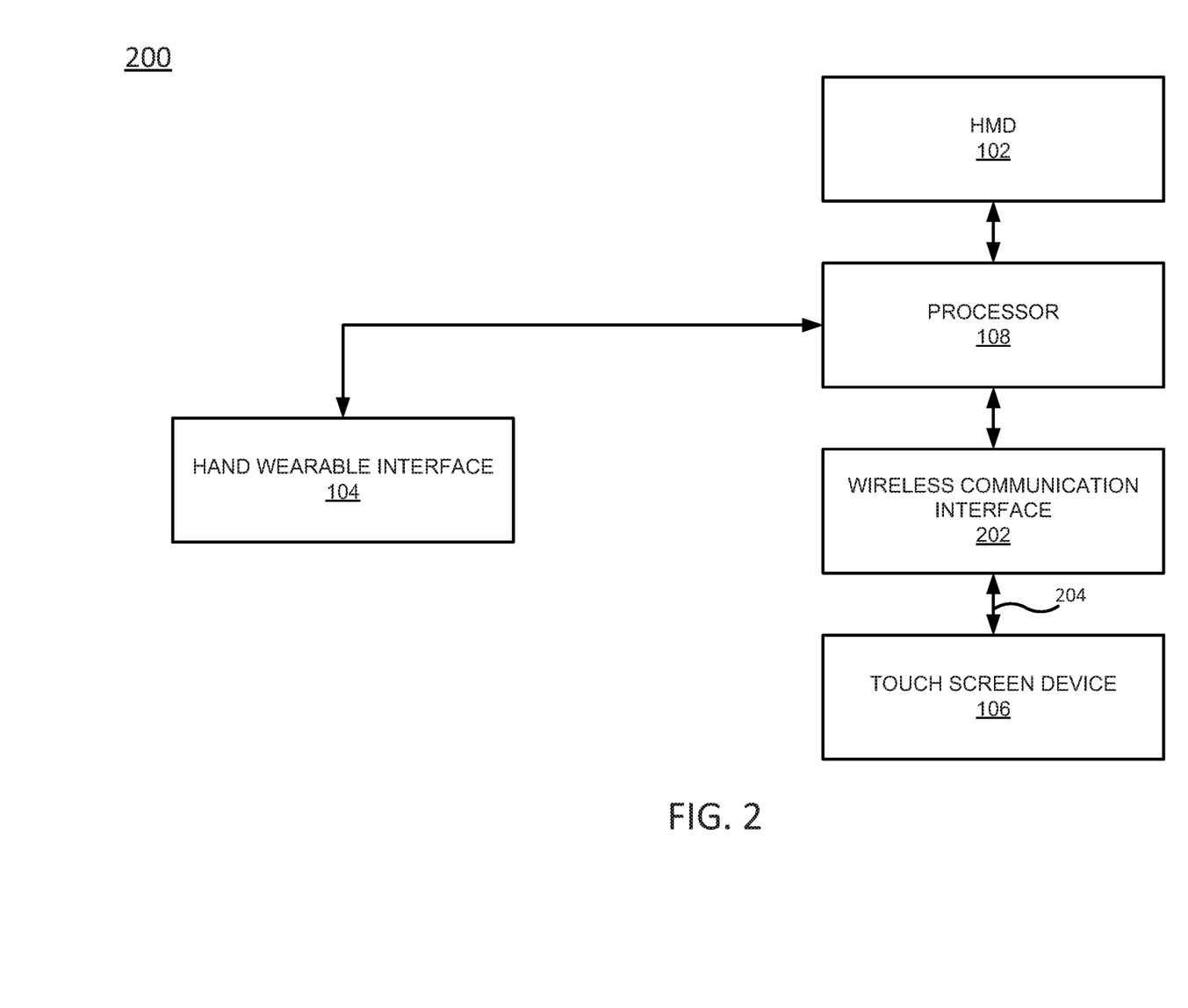
FIG. 2 illustrates a block diagram of the virtual reality system the present disclosure.

FIG. 2 illustrates a block diagram of a VR system 200. The VR system 200 may include similar components as the VR system 100 illustrated in FIG. 1. In one example, the HMD 102 may be communicatively coupled to the processor 108. The HMD 102 may be to display the computer generated artificial world when the HMD 102 is operating in a VR mode. In other words, a user may not be able to see his or her surroundings when wearing the HMD 102 and interacting with the computer generated artificial world in the VR mode.

The processor 108 may also be communicatively coupled to the hand wearable interface 104. As discussed above, the processor 108 may communicate with the hand wearable interface 104 via a wired or wireless connection. The hand wearable interface 104 may be worn around the back of a user's hand to provide motion detection, gesture detection, and the like to the processor 108.

The processor 108 may also be communicatively coupled to a wireless communication interface 202. The wireless communication interface 202 may establish a wireless connection 204 to the touch screen device 106. The processor 108 may then receive inputs from the touch screen device 106 over the wireless connection 204.

In one example, the touch screen device 106 may be registered with a VR application executed by the processor 108, as noted above. In one example, a plurality of different touch screen devices 106 that are associated with, or owned by, a user may be registered with the VR system 100. For example, the user may have a touch screen phone and a touch screen tablet device to use in the computer generated artificial world.

In addition to learning the dimensions of the touch screen device 106, the registration process may be used to download an application on the touch screen device 106 that works with the VR mode of the HMD 102. For example, the application may allow the touch screen device 106 to automatically establish the wireless connection 204 with the processor 108 when the touch screen device 106 is located.

The application may also allow the touch screen device 106 to track which locations (e.g., x-y coordinates) of the display are touched and transmit the location information to the processor 108. The processor 108 may then identify a touch input displayed on an avatar of the touch screen device 106 that is displayed in the computer generated artificial world. The touch input may be associated with a function and the function may be executed in the computer generated artificial world during the VR mode of the HMD 102.

Figure 3:
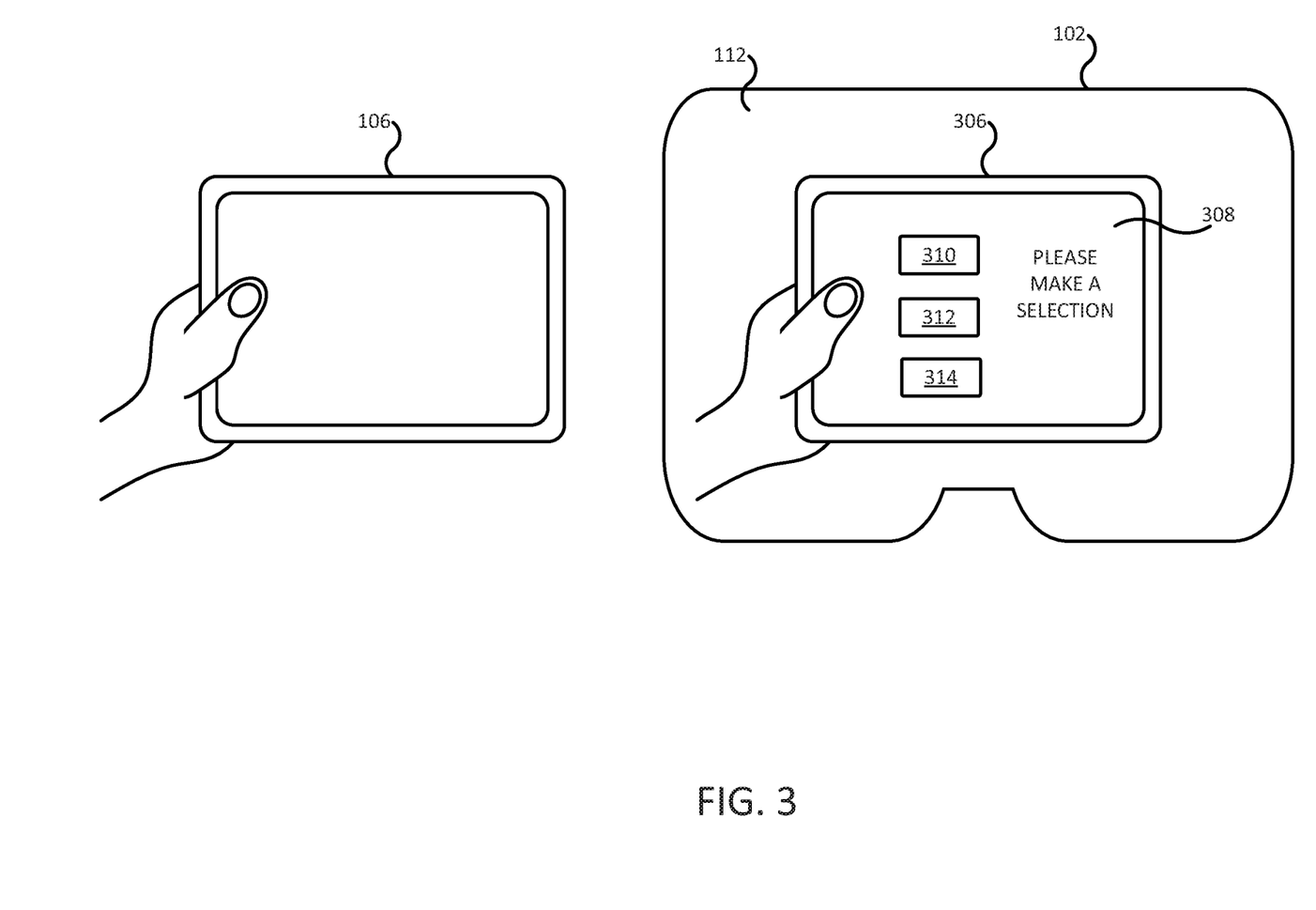
FIG. 3 illustrates an example display of the touch surface device in a virtual reality display of the virtual reality system of the present disclosure.

FIG. 3 illustrates an example display 112 of an avatar 306 of the touch screen device 106 in the HMD 102 of the VR system 100. For example, after the touch screen device 106 is located and an indication that the user is holding the touch screen device 106 is received, the display 112 may show the avatar 306 of the touch screen device 106. The avatar 306 may show the touch screen device 106 in an orientation in which the user is holding the touch screen device 106. The avatar 306 may also show touch inputs 310, 312, and 314 of a graphical user interface (GUI) 308.

The dimensions of the avatar 306 may be similar to the dimensions of the touch screen device 106. The size of the GUI 308 may be similar to the size of a GUI that would be displayed on the touch screen device 106. The number and size of the touch inputs 310, 312, and 314 may be a function of the size, or dimensions, of the touch screen device 106.

As shown in FIG. 3, the touch screen device 106 may be powered on and active, but display a blank screen. In other words, the touch screen device 106 may not show any information or GUI despite being activated and connected to the HMD 102. In some examples, the touch screen device 106 may be a touch screen device without a display. Since the touch screen device 106 does not show any information, a touch screen device without a display may be used with the VR system 100.

However, in the display 112 that shows the computer generated artificial world, the avatar 306 may display the GUI 308 with touch inputs 310, 312, and 314. It should be noted that although three touch inputs are illustrated in FIG. 3, any number of touch inputs may be displayed in the avatar 306. In the computer generated artificial world, the user may want to select the touch input 310. The user may touch a location on the touch screen device 106 that is associated with the location of the touch input 310 in the avatar 306. The touch screen device 106 may detect the touch and record a location that is touched. The location may be transmitted to the processor 108 of the HMD 102 via the wireless connection 204.

In one example, the touch screen device 106 may display images associated with an application or operating system executed by the touch screen device 106. The images on the touch screen device 106 may be transmitted to the processor 108 to be displayed on the display 112. Thus, the GUI 308 with the touch inputs 310, 312, and 314 may be what is shown on the touch screen device 106. In other words, the display 112 may show what is actually displayed by the touch screen device 106. This may allow the user to check messages, notifications, and the like, on the touch screen device 106 while using the touch screen device 106 in the computer generated artificial world.

The processor 108 may determine which touch input was selected based on the location information that is received from the touch screen device 106. For example, the processor 108 may determine that the touch input 310 was selected based on the location information from the touch screen device 106.

The processor 108 may then determine a function that is associated with the touch input 310. For example, the touch inputs 310, 312, and 314 may be associated with different functions that can be executed in the computer generated world. For example, the computer generated world may be a construction simulation. Each touch input 310, 312, and 314 may be a touch input to use a different tool, use a different vehicle, build a different structure, and the like. The touch input 310 may be associated with a function to demolish a structure. The processor 108 may determine that the touch input 310 has been selected to demolish a structure. The processor 108 may then prompt a user to select a structure in the computer generated artificial world and demolish the structure that is selected based on the selection of the touch input 310.

It should be noted that the inputs 310, 312, and 314 may be associated with other functions in different applications. For example, the computer generated artificial world may be a video game, a travel simulator, and the like, and the inputs 310, 312, and 314 may execute different functions in the different computer generated artificial worlds.

As a result, the VR system 100 may allow a user to locate a touch screen device 106 while using the HMD 102. Thus, the user does not need to deactivate a VR mode and remove the HMD 102 to locate the touch screen device 106. In addition, the touch screen device 106 may be connected to the HMD 102 and used to provide touch inputs in the computer generated artificial world. For example, an avatar 306 of the touch screen device 106 may be shown in the computer generated artificial world and used to interact, or execute different functions, in the computer generated artificial world.

Figure 4:
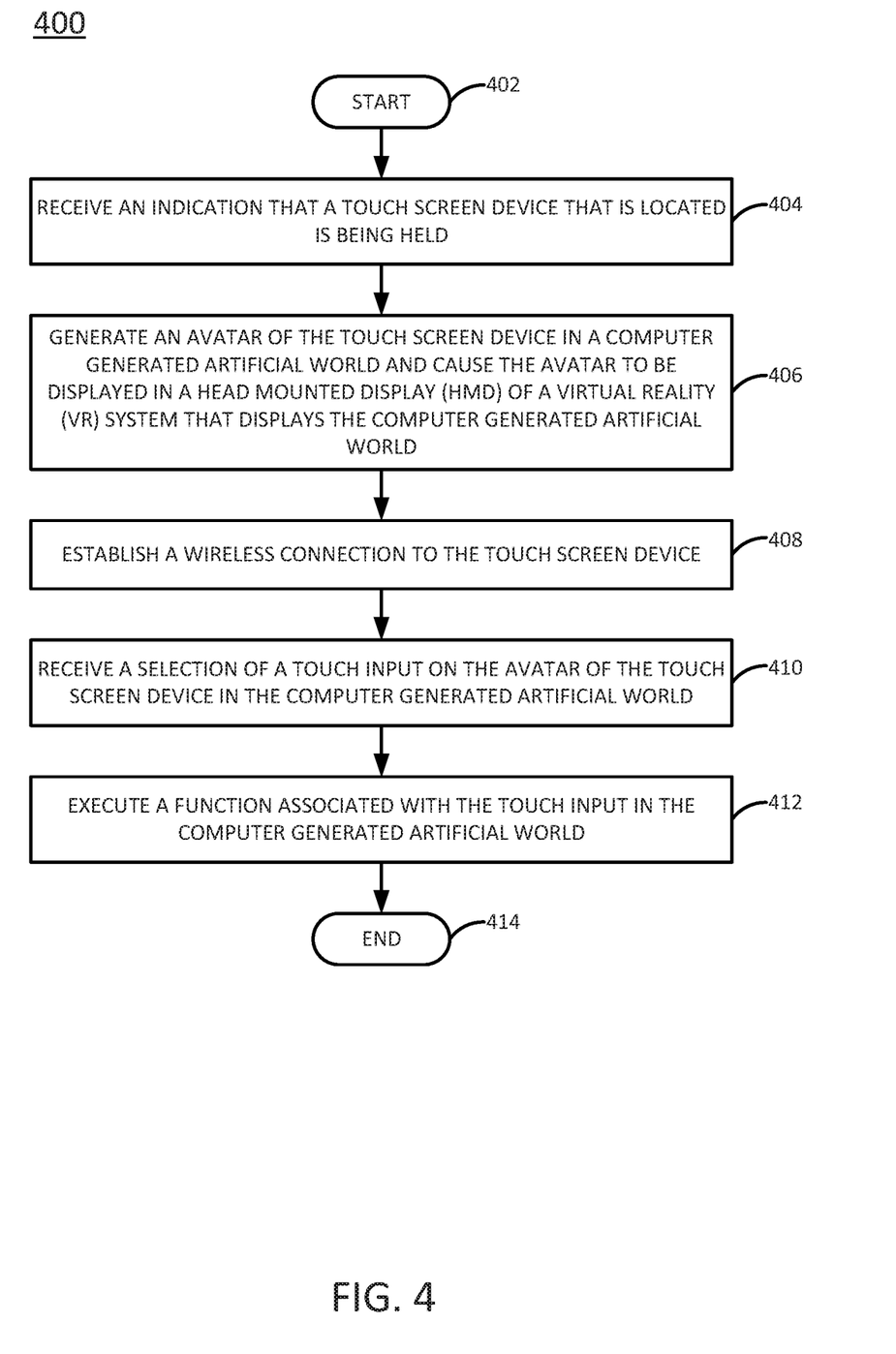
FIG. 4 is a flow chart of an example method for connecting a virtual reality device to a touch surface device to receive an input from the touch surface device.

FIG. 4 illustrates a flow diagram of an example method 400 for connecting a virtual reality device to a touch surface device to receive an input from the touch surface device. In one example, the method 400 may be performed by the virtual reality system 100, or the apparatus 500 illustrated in FIG. 5 and described below.

At block 402, the method 400 begins. At block 404, the method 400 receives an indication that a touch screen device that is located is being held. For example, the user may want to use the touch screen device to provide inputs to a virtual reality world in a virtual reality system. The user may not be able to see his or her surroundings in the real world while in the virtual reality world.

As a result, one of the methods described above can be used to locate the touch screen device. In one example, the indication may be a haptic feedback that is triggered when the touch screen device is located and/or held. In one example, the indication may be an audible indication when the touch screen device is located and/or held. For example, a beep or tone may be played in the audio of the virtual reality system. In one example, the indication may be a visual indication when the touch screen device is located and/or held. For example, an outline of the touch screen device may flash or the touch screen device may be displayed in the virtual reality system.

At block 406, the method 400 generates an avatar of the touch screen device in a computer generated artificial world and causes the avatar to be displayed in a head mounted display (HMD) of a virtual reality (VR) system that displays the computer generated artificial world. For example, a graphical representation of the touch screen device may be generated and displayed in the HMD of the VR system.

In one example, the avatar of the touch screen device may display an image or interface that is not shown on the real touch screen device. For example, the touch screen device in reality may be powered on, but display a blank screen. However, the avatar of the touch screen device may display a menu with different buttons that can be selected. The VR system may know the dimensions of the touch screen device via a registration process. The registration process may also include downloading an application on the touch screen device that works with the VR system such that the touch screen device can identify and communicate selections of certain areas of the touch screen device to the VR system.

Thus, the VR system may know how to size and locate the menu and buttons in the avatar of the touch screen device. The location of a button in the avatar of the touch screen device may correspond to a same location on the real touch screen device.

At block 408, the method 400 establishes a wireless connection to the touch screen device. The touch screen device may communicate wirelessly with the virtual reality system to exchange data, inputs, and outputs. In one example, the wireless connection may be a Bluetooth low energy (BLE) connection, a Wi-Fi connection, a local area network (LAN) connection, and the like. The VR system may automatically initiate a pairing process or process to establish the wireless connection when the touch screen device is located and confirmed to be held.

At block 410, the method 400 receives a selection of a touch input on the avatar of the touch screen device in the computer generated artificial world. For example, a user may be playing a game in the computer generated artificial world. The touch screen device may be used to make a selection in the game. A user may touch an area of the screen of the real touch screen device via interaction with the avatar of the touch screen device in the computer generated artificial world.

The real touch screen device may detect a location of where the user touched the display of the real touch screen device. The location may be transmitted to the VR system. The VR system may associate a touch input on the avatar of the touch screen device with the location of the real touch screen device that was touched.

At block 412, the method 400 executes a function associated with the touch input in the computer generated artificial world. In one example, each button in the avatar of the touch screen device may be associated with a function within the computer generated artificial world. When the selection of the touch input is received in the block 410, the VR system may identify the function associated with the touch input that is selected. Using the game example above, selecting a touch input in the computer generated artificial world may equip a particular armament. Thus, when the armament touch input is selected in the computer generated artificial world, the particular armament may be equipped in the computer generated artificial world. At block 414, the method 400 ends.

Figure 5:
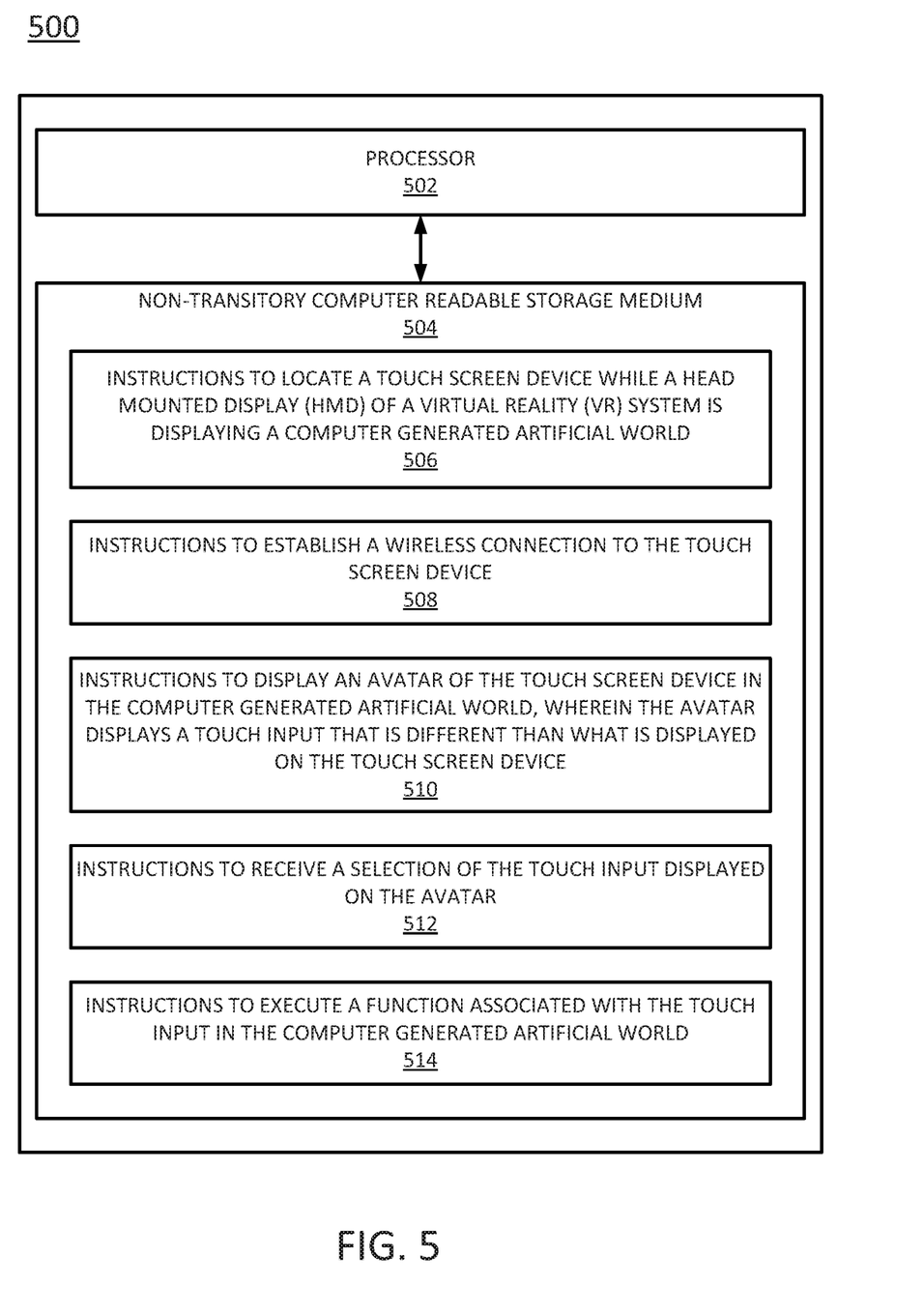
FIG. 5 is a block diagram of an example non-transitory computer readable storage medium storing instructions executed by a processor of the present disclosure.

FIG. 5 illustrates an example of an apparatus 500. In one example, the apparatus 500 may be the virtual reality system 100. In one example, the apparatus 500 may include a processor 502 and a non-transitory computer readable storage medium 504. The non-transitory computer readable storage medium 504 may include instructions 506, 508, 510, 512, and 514 that, when executed by the processor 502, cause the processor 502 to perform various functions.

In one example, the instructions 506 may include instructions to locate a touch screen device while a head mounted display (HMD) of a virtual reality (VR) system is displaying a computer generated artificial world. The instructions 508 may include instructions to establish a wireless connection to the touch screen device. The instructions 510 may include instructions to display an avatar of the touch screen device in the computer generated artificial world, wherein the avatar displays a touch input that is different than what is displayed on the touch screen device. The instructions 512 may include instructions to receive a selection of the touch input displayed on the avatar. The instructions 514 may include instructions to execute a function associated with the touch input in the computer generated artificial world.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:
1. A virtual reality (VR) system, comprising:
 a head mounted display (HMD) to display a computer generated artificial world;
 a hand wearable interface;
 a wireless communication interface to establish a wireless communication path; and
 a processor communicatively coupled to the HMD, the hand wearable interface, and the wireless communication interface, the processor to receive an indication that a touch screen device is located from a locator device in the HMD or the hand wearable device, to establish a wireless connection to the touch screen device via the wireless communication interface, and to receive an input via the touch screen device, wherein the touch screen device is registered with the HMD such that the HMD can send a signal to the touch screen device to wake the touch screen device to emit an indicator that can be detected by the HMD.
2. The VR system of claim 1, wherein the indicator comprises a pre-defined dynamic marker and wherein the locator device comprises:
 a camera coupled to the HMD and communicatively coupled to the processor to detect the pre-defined dynamic marker on the touch screen device and transmit the pre-defined dynamic marker to the processor as the indication.
3. The VR system of claim 1, wherein the indicator comprises a wavelength of light emitted by the touch screen device and wherein the locator device comprises:
 a camera coupled to the HMD and communicatively coupled to the processor to detect the wavelength of light emitted by the touch screen device that is invisible to a human eye and to transmit the wavelength of the light that is detected to the processor as the indication.
4. The VR system of claim 1, wherein the locator device comprises:
 a wireless emitter located in the hand wearable interface to emit a wireless signal; and
 a wireless receiver located in the hand wearable interface to receive a response signal from the touch screen device in response to the touch screen device receiving the wireless signal.
5. The VR system of claim 4, wherein the hand wearable interface comprises a haptic feedback device to provide haptic feedback when the hand wearable interface is located over the touch screen device.

6. The VR system of claim 1, wherein the processor is to generate an avatar of the touch screen device when the touch screen device is located and the HMD is to display the avatar in the computer generated artificial world.
7. The VR system of claim 6, wherein the processor is to generate touch screen input buttons for the avatar of the touch screen device and the HMD is to display the touch screen input buttons on the avatar of the touch screen device in the computer generated artificial world.
8. A non-transitory computer readable storage medium encoded with instructions executable by a processor, the non-transitory computer-readable storage medium comprising:
 instructions to locate a touch screen device while a head mounted display (HMD) of a virtual reality (VR) system is displaying a computer generated artificial world, wherein the touch screen device is registered with the VR system such that the VR system can send a signal to the touch screen device to wake the touch screen device to emit an indicator that can be detected by the HMD;
 instructions to establish a wireless connection to the touch screen device;
 instructions to display an avatar of the touch screen device in the computer generated artificial world, wherein the avatar displays a touch input that is different than what is displayed on the touch screen device;
 instructions to receive a selection of the touch input displayed on the avatar; and
 instructions to execute a function associated with the touch input in the computer generated artificial world.
9. The non-transitory computer readable storage medium of claim 8, wherein the indicator comprises a pre-defined dynamic marker and wherein the instructions to locate the touch screen device, comprises:
 instructions to detect the pre-defined dynamic marker on the touch screen device.
10. The non-transitory computer readable storage medium of claim 8, wherein the indicator comprises a wavelength of light emitted by the touch screen device and wherein the instructions to locate the touch screen device, comprises:
 instructions to detect the wavelength of light emitted by the touch screen device that is invisible to a human eye.
11. The non-transitory computer readable storage medium of claim 8, wherein the instructions to locate the touch screen device, comprises:
 instructions to emit a wireless signal that is received by the touch screen device;
 instructions to receive a response signal from the touch screen device in response to the touch screen device receiving the wireless signal;
 instructions to calculate a distance to the touch screen device based on the response signal.
12. The non-transitory computer readable storage medium of claim 11, further comprising:
 instructions to change a size of the avatar of the touch screen based on the distance as the distance changes.
13. A method, comprising:
 receiving, by a processor, an indication that a touch screen device that is located is being held, wherein the touch screen device is registered with a virtual reality (VR) system such that the VR system can send a signal to the touch screen device to wake the touch screen device to emit an indicator that can be detected by a head mounted display (HMD) of the VR system;
 generating, by the processor, an avatar of the touch screen device in a computer generated artificial world and causing the avatar to be displayed in the HMD that displays the computer generated artificial world;

establishing, by the processor, a wireless connection to the touch screen device;

receiving, by the processor, a selection of a touch input on the avatar of the touch screen device in the computer generated artificial world; and executing, by the processor, a function associated with the touch input in the computer generated artificial world.

14. The method of claim 13, further comprising:

registering, by the processor, a plurality of touch screen devices associated with a user by storing in memory of the VR system an identification and a screen size of each one of the plurality of touch screen devices.

15. The method of claim 14, wherein the indicator comprises an area of light, the method further comprising:

detecting, by the processor, the area of light that is approximately equal to the screen size of the touch screen device to locate the touch screen device.

16. The VR system of claim 1, wherein the processor is further to:

record a location of the touch screen device where the touch screen device is set down.

* * * * *